US011999359B2

(12) United States Patent
Yamamoto et al.

(10) Patent No.: US 11,999,359 B2
(45) Date of Patent: Jun. 4, 2024

(54) VEHICULAR ORIENTATION DETECTION SYSTEM

(71) Applicant: AICHI STEEL CORPORATION, Aichi (JP)

(72) Inventors: Michiharu Yamamoto, Aichi (JP); Tomohiko Nagao, Aichi (JP); Hitoshi Aoyama, Aichi (JP)

(73) Assignee: AICHI STEEL CORPORATION, Aichi (JP)

(*) Notice: Subject to any disclaimer, the term of this patent is extended or adjusted under 35 U.S.C. 154(b) by 585 days.

(21) Appl. No.: 16/328,286

(22) PCT Filed: Aug. 24, 2017

(86) PCT No.: PCT/JP2017/030274
§ 371 (c)(1),
(2) Date: Feb. 26, 2019

(87) PCT Pub. No.: WO2018/043272
PCT Pub. Date: Mar. 8, 2018

(65) Prior Publication Data
US 2021/0300388 A1 Sep. 30, 2021

(30) Foreign Application Priority Data
Aug. 30, 2016 (JP) ................... 2016-168474

(51) Int. Cl.
*B60W 40/10* (2012.01)
*E01F 11/00* (2006.01)
(52) U.S. Cl.
CPC ............ *B60W 40/10* (2013.01); *E01F 11/00* (2013.01); *B60W 2420/50* (2013.01);
(Continued)

(58) Field of Classification Search
CPC ............ B60W 40/10; B60W 2520/06; B60W 2556/45; B60W 2540/18; B60W 2420/50; E01F 11/00
See application file for complete search history.

(56) References Cited

U.S. PATENT DOCUMENTS 5,347,456 A 9/1994 Zhang et al.
5,913,376 A 6/1999 Takei
(Continued)

FOREIGN PATENT DOCUMENTS

DE 198 03 043 A1 8/1998
JP 9-183383 A 7/1997
(Continued)

OTHER PUBLICATIONS

Vehicle Position Estimation Based on Magnetic Markers by Byun et al. (Year: 2015).*
(Continued)

*Primary Examiner* — Elaine Gort
*Assistant Examiner* — Chanmin Park
(74) *Attorney, Agent, or Firm* — XSENSUS LLP

(57) ABSTRACT

A vehicular orientation detection system (1) for detecting an orientation of a vehicle (5) traveling a road surface (100S) where magnetic markers (10) are laid includes sensor units (11) which each include a plurality of magnetic sensors arrayed in a vehicle width direction and measure a lateral shift amount with respect to the magnetic markers (10) and a control unit (12) which computes a difference between lateral shift amounts measured with any one of the magnetic markers (10) by front and rear sensor units (11) positioned at two locations separated in a longitudinal direction of the vehicle (5).

10 Claims, 17 Drawing Sheets

(52) U.S. Cl.
CPC ..... *B60W 2520/06* (2013.01); *B60W 2540/18* (2013.01); *B60W 2556/45* (2020.02)

(56) References Cited

U.S. PATENT DOCUMENTS

| | | | |
|---|---|---|---|
| 5,925,080 | A | 7/1999 | Shimbara et al. |
| 6,134,509 | A | 10/2000 | Furusho et al. |
| 2006/0086543 | A1 | 4/2006 | Motoyama |
| 2009/0093924 | A1* | 4/2009 | Aso ............... B60W 40/10 701/31.4 |
| 2011/0264320 | A1 | 10/2011 | Arnaud et al. |
| 2013/0060413 | A1* | 3/2013 | Lee ............... B62D 6/00 701/23 |
| 2015/0247719 | A1 | 9/2015 | Huang et al. |
| 2015/0294430 | A1* | 10/2015 | Huang ............ G06Q 50/26 701/2 |
| 2016/0082957 | A1 | 3/2016 | Zsombory et al. |

FOREIGN PATENT DOCUMENTS

| | | | |
|---|---|---|---|
| JP | 9-269831 A | 10/1997 | |
| JP | 10-160486 A | 6/1998 | |
| JP | 2006-117176 A | 5/2006 | |
| JP | 3808559 B2 * | 8/2006 | ......... B60K 31/0008 |
| JP | 2012-137823 A | 7/2012 | |

OTHER PUBLICATIONS

Extended European Search Report dated May 12, 2020 in European Patent Application No. 17846277.6, 9 pages.

Qing-Bin Liu, "Study on Application of Magnetic Induction System in Highway Engineering Vehicles", Development & Innovation of Machinery & Electrical Products, vol. 26, No. 2, Mar. 2013, 6 pages.

International Search Report dated Nov. 21, 2017 for PCT/JP2017/030274 filed on Aug. 24, 2017, 9 pages including English Translation.

* cited by examiner

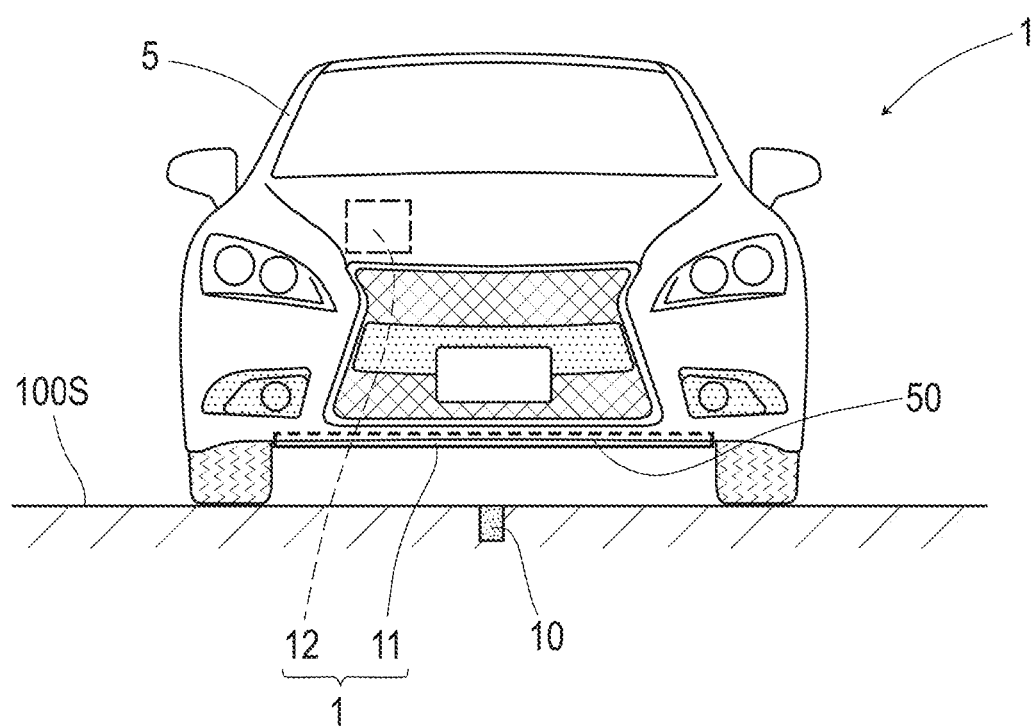
[FIG. 1]

[FIG. 2]
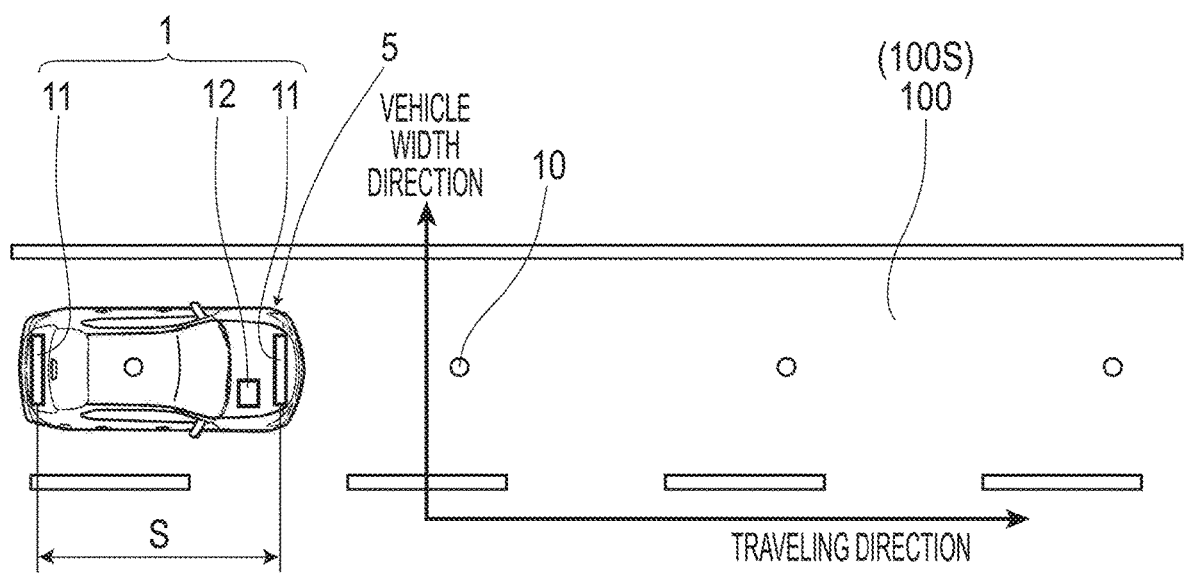

[FIG. 3]
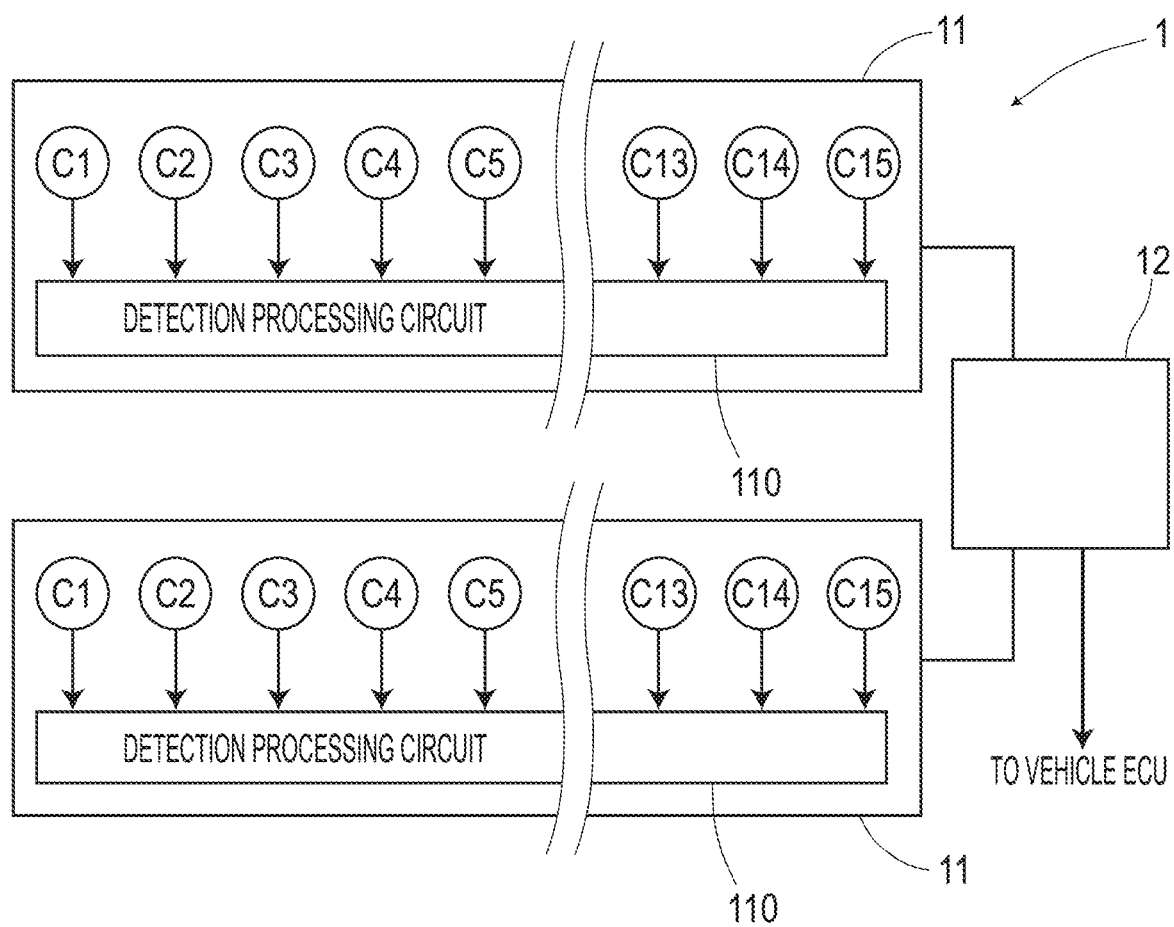

[FIG. 4]
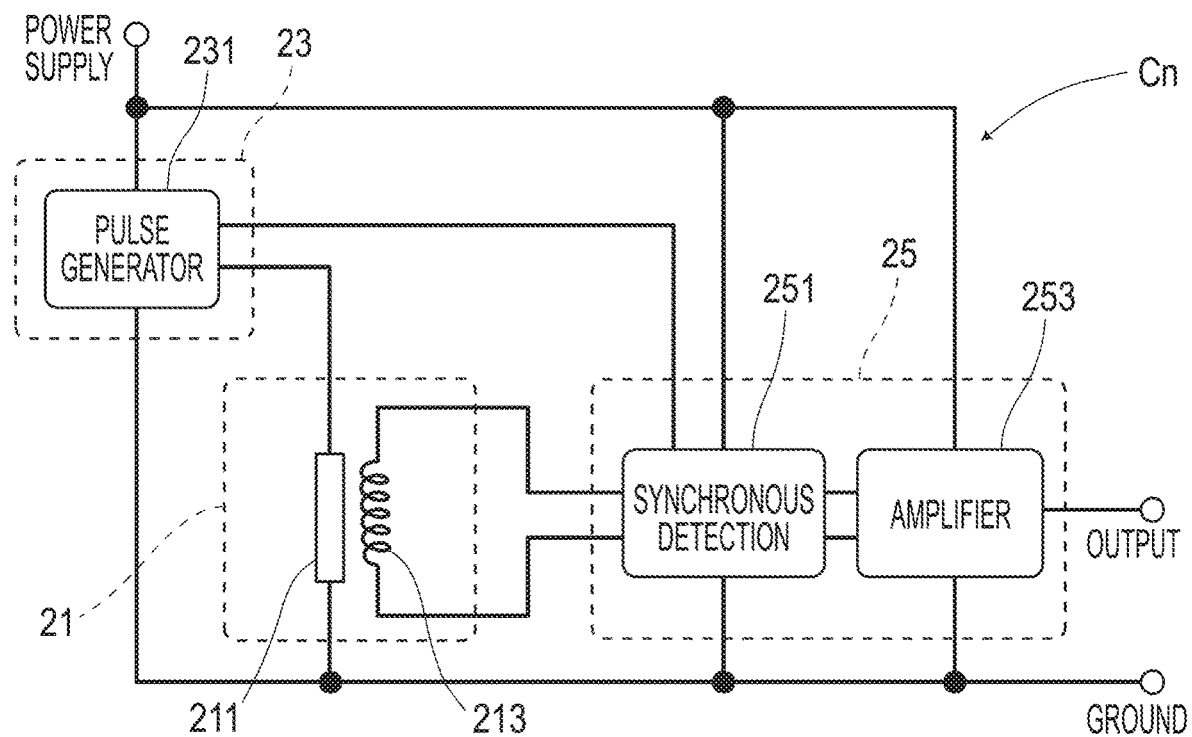

[FIG. 5]
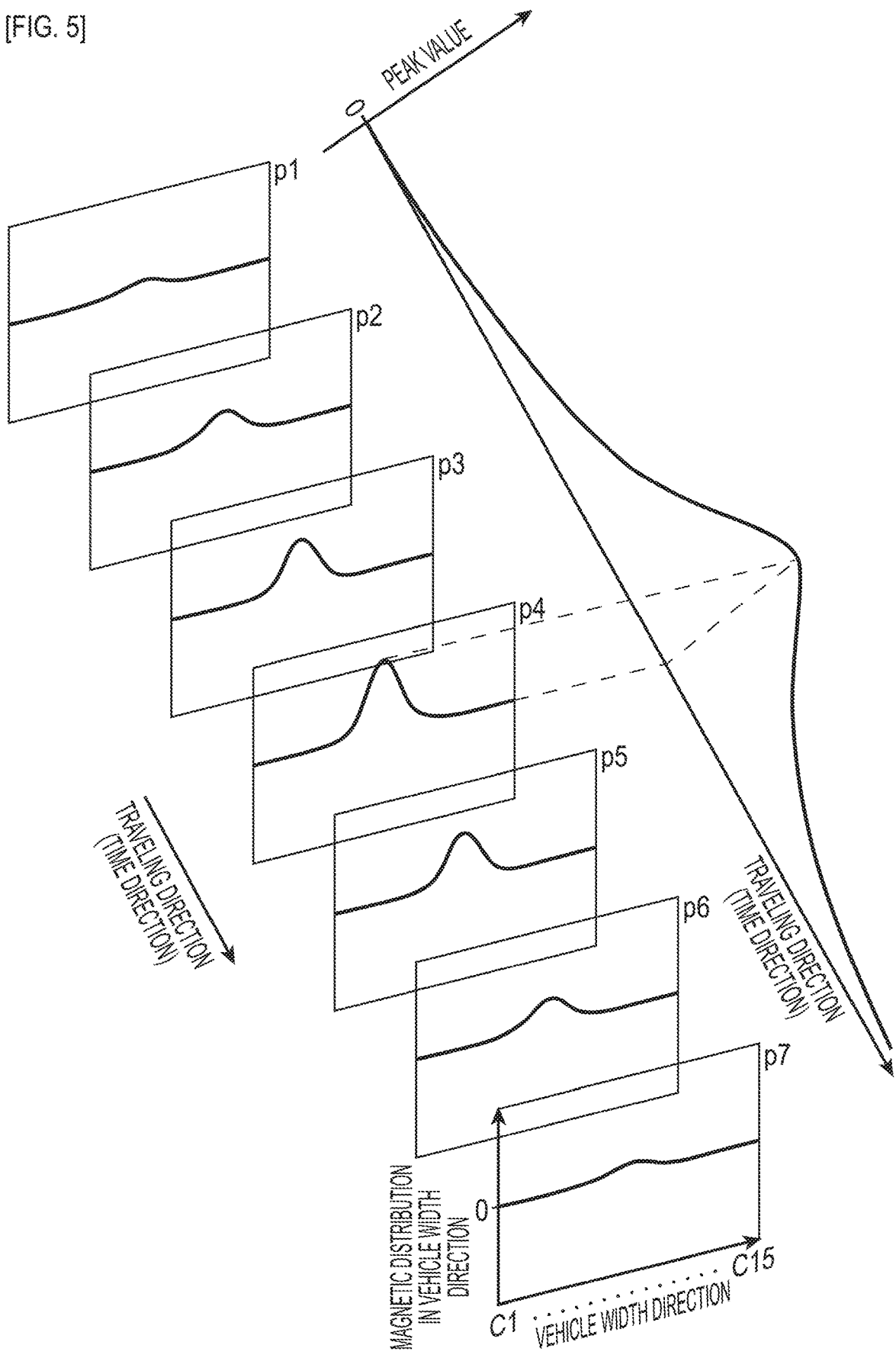

[FIG. 6]
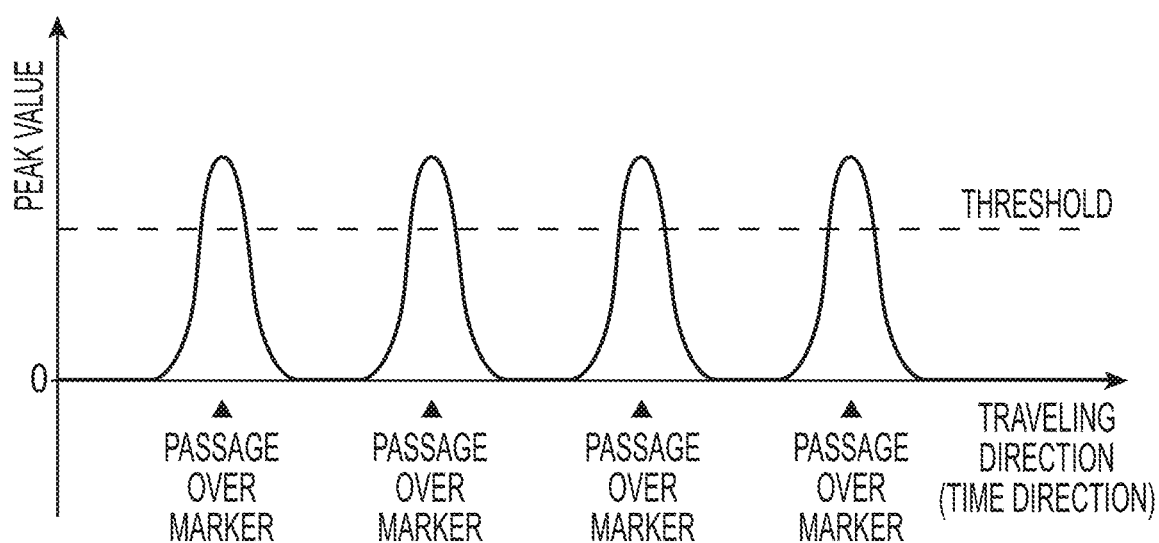

[FIG. 7]
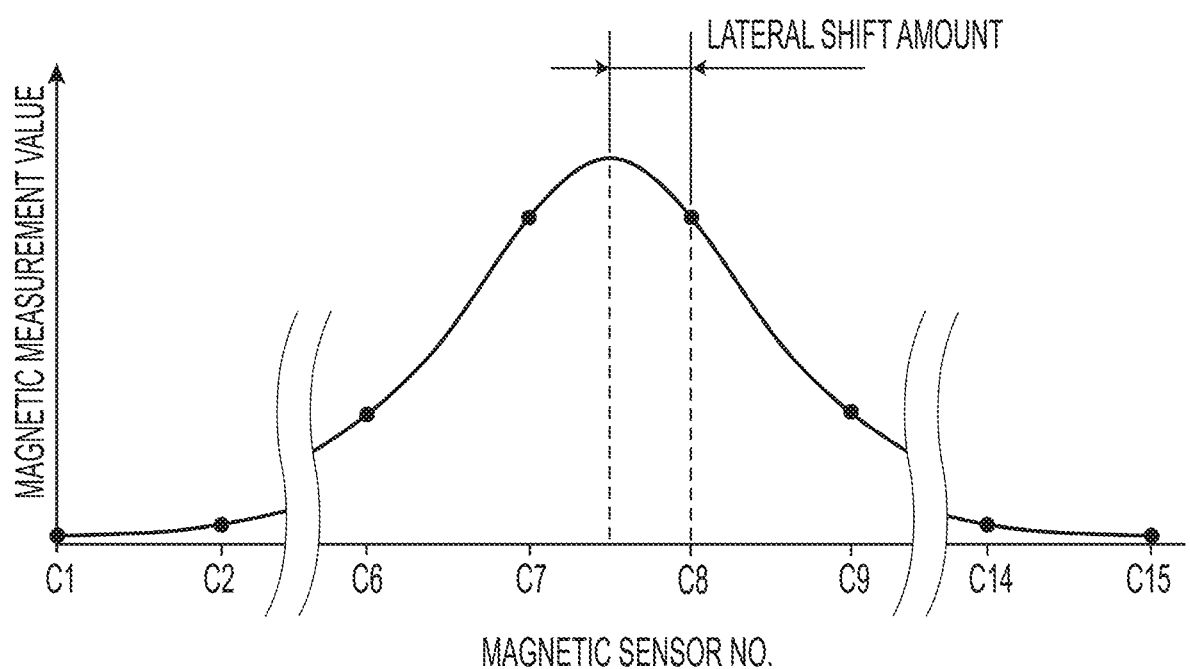

[FIG. 8]
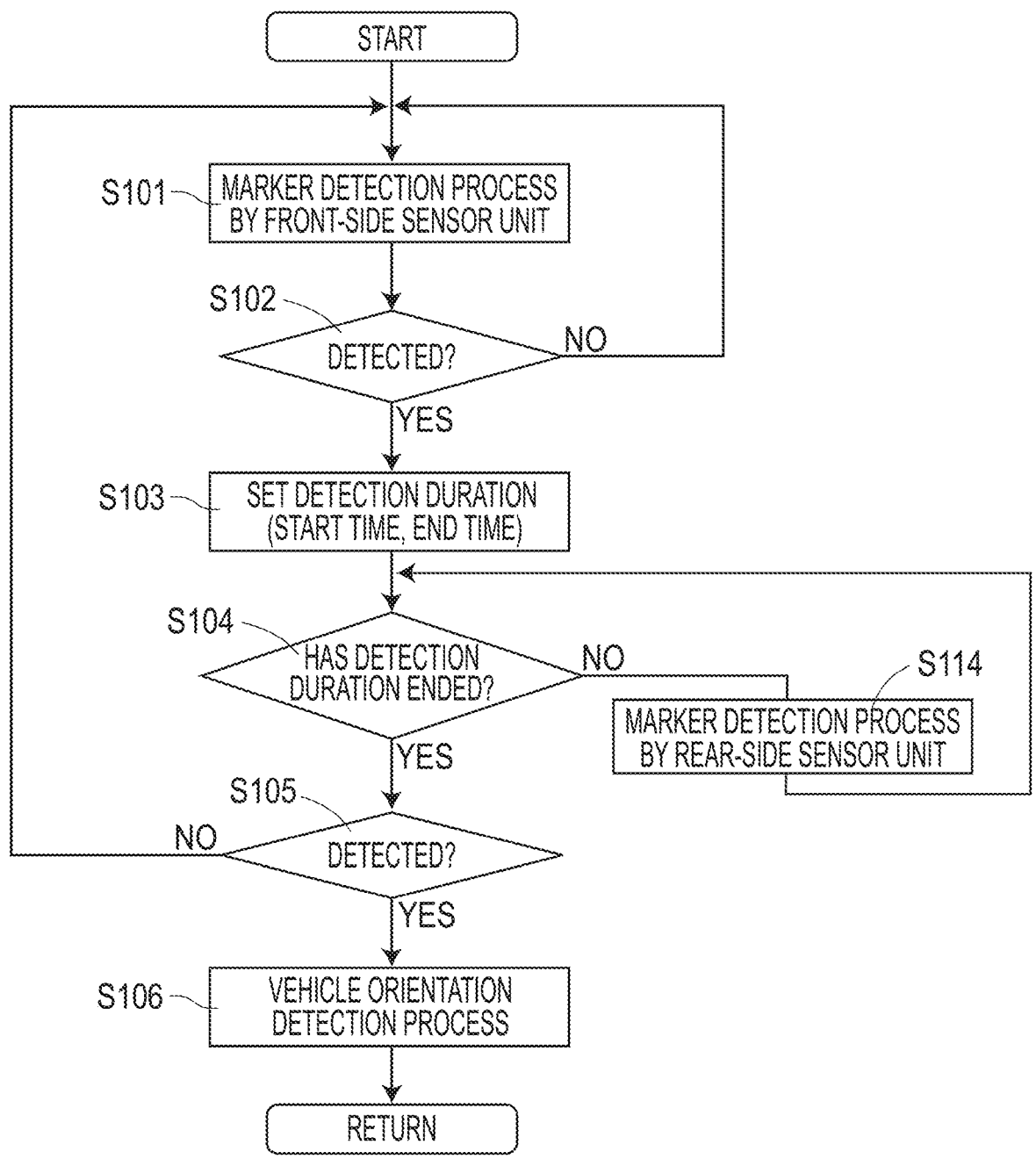

[FIG. 9]
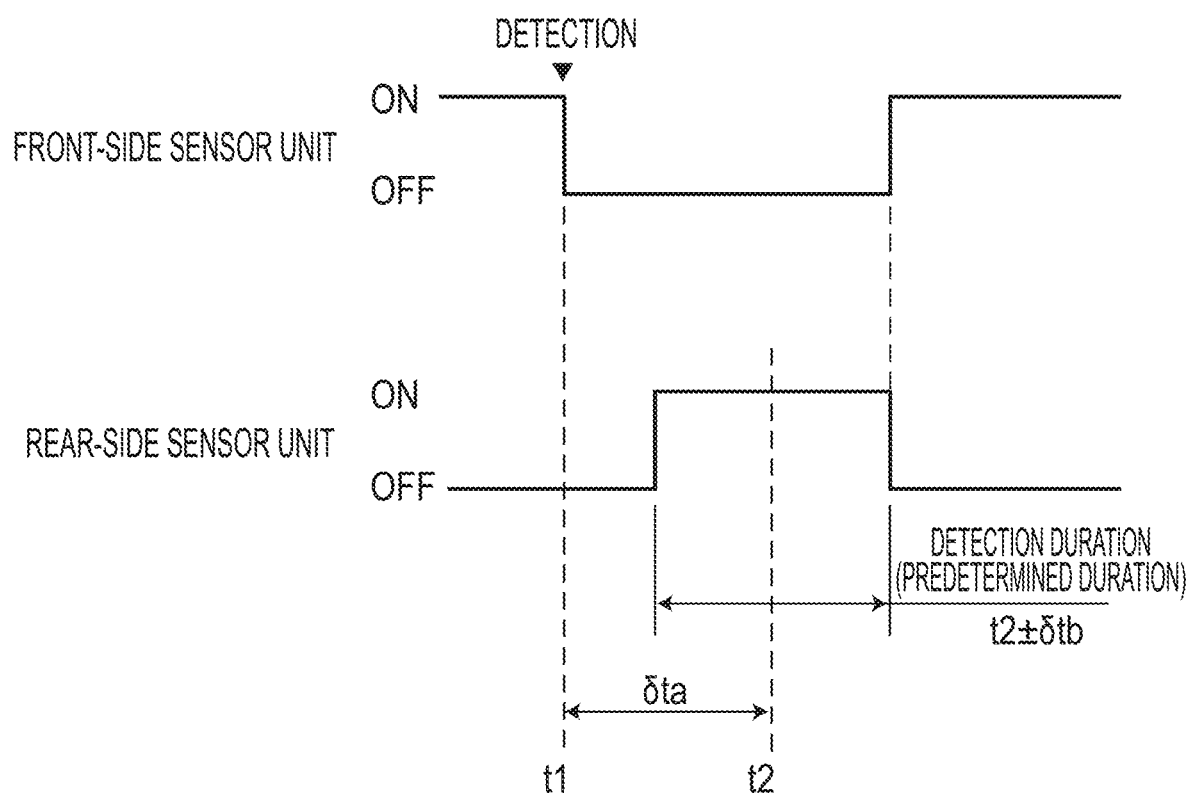

[FIG. 10]
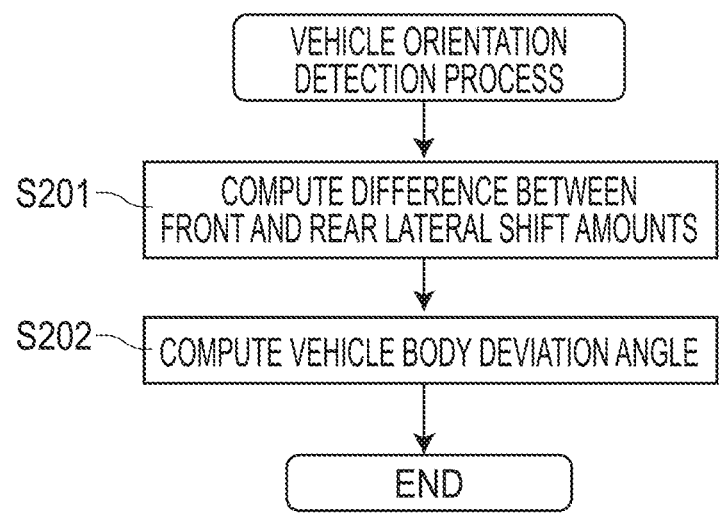

[FIG. 11]
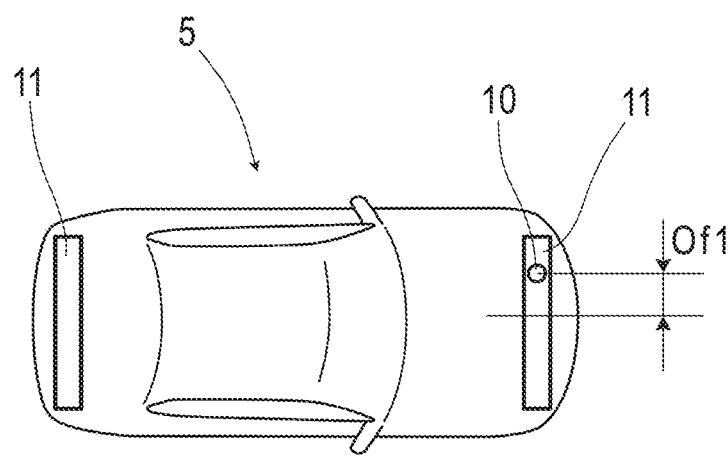
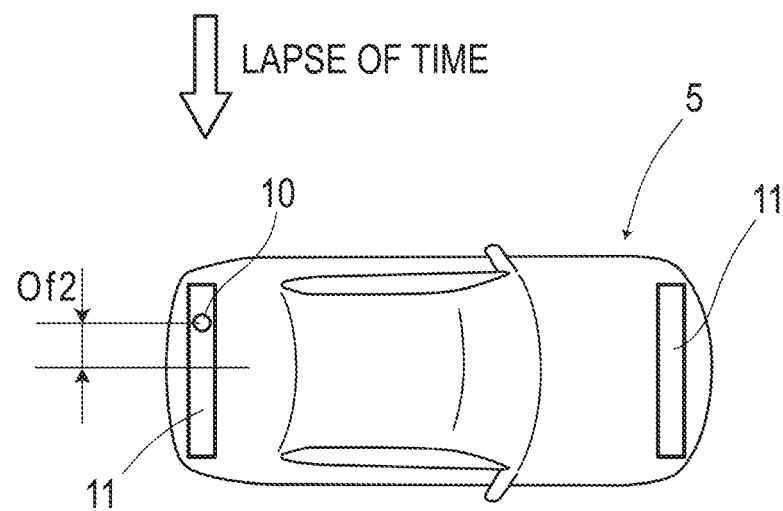

[FIG. 12]
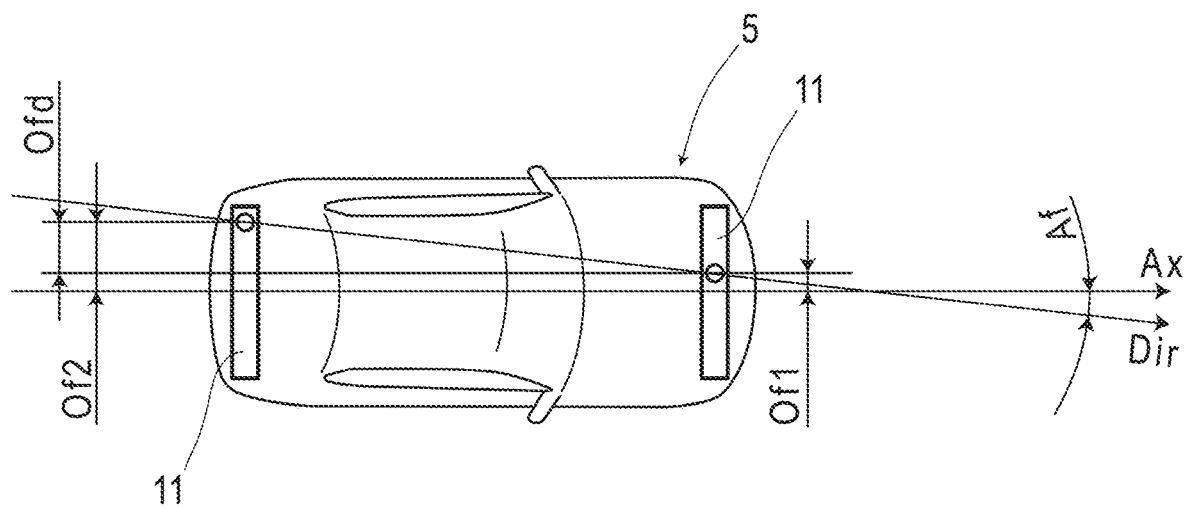

[FIG. 13]
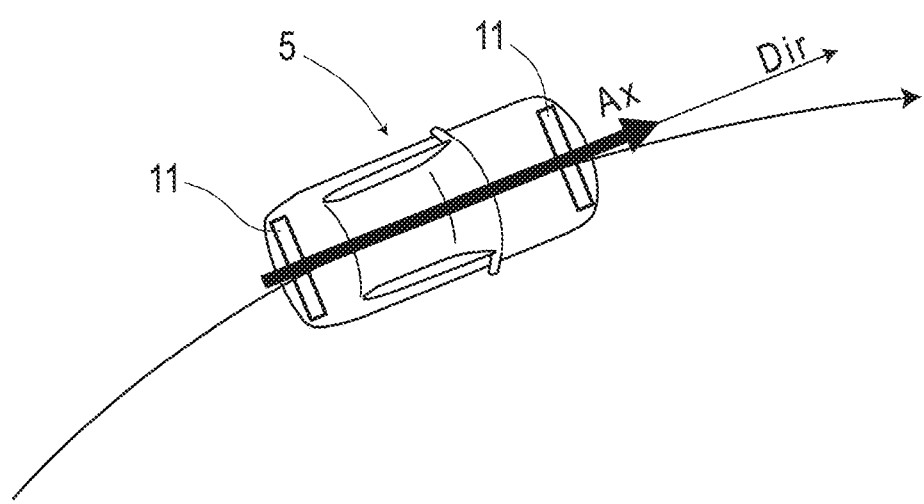

[FIG. 14]
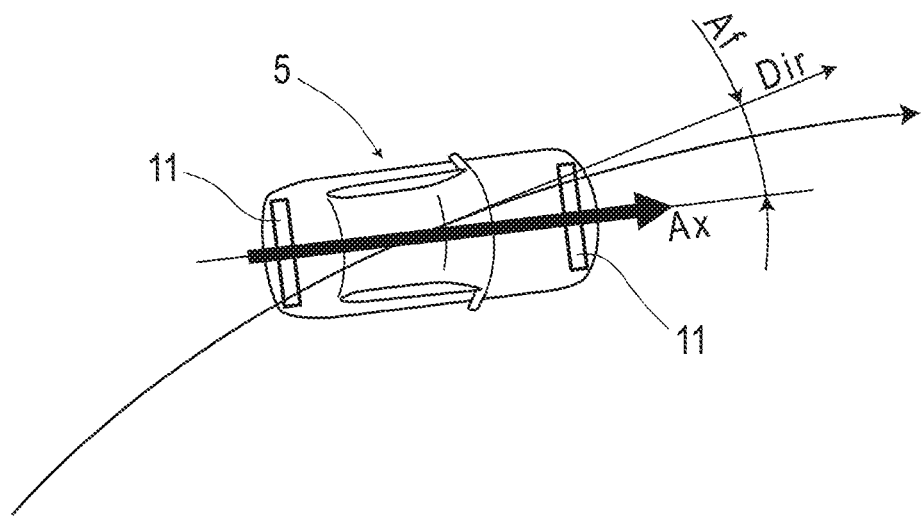

[FIG. 15]
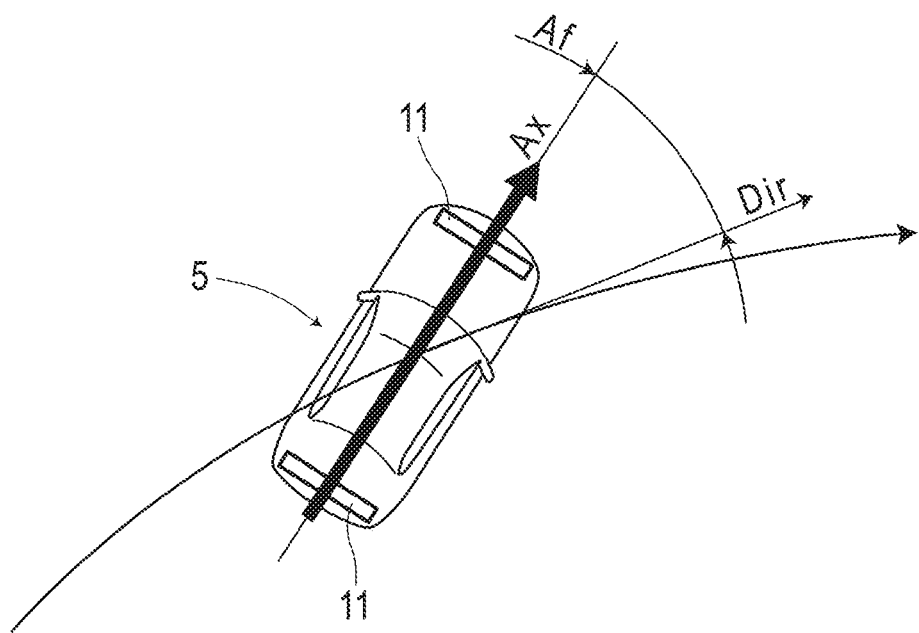

[FIG. 16]
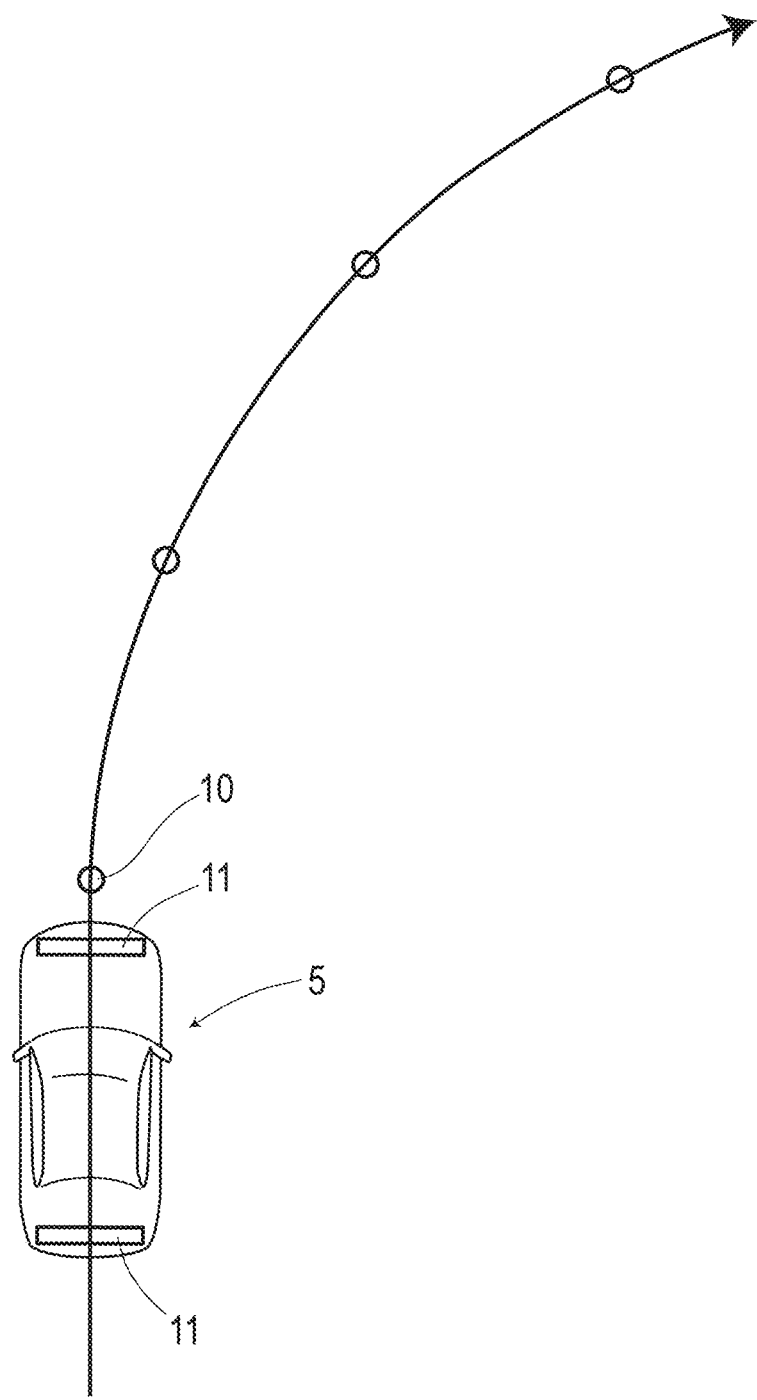

[FIG. 17]
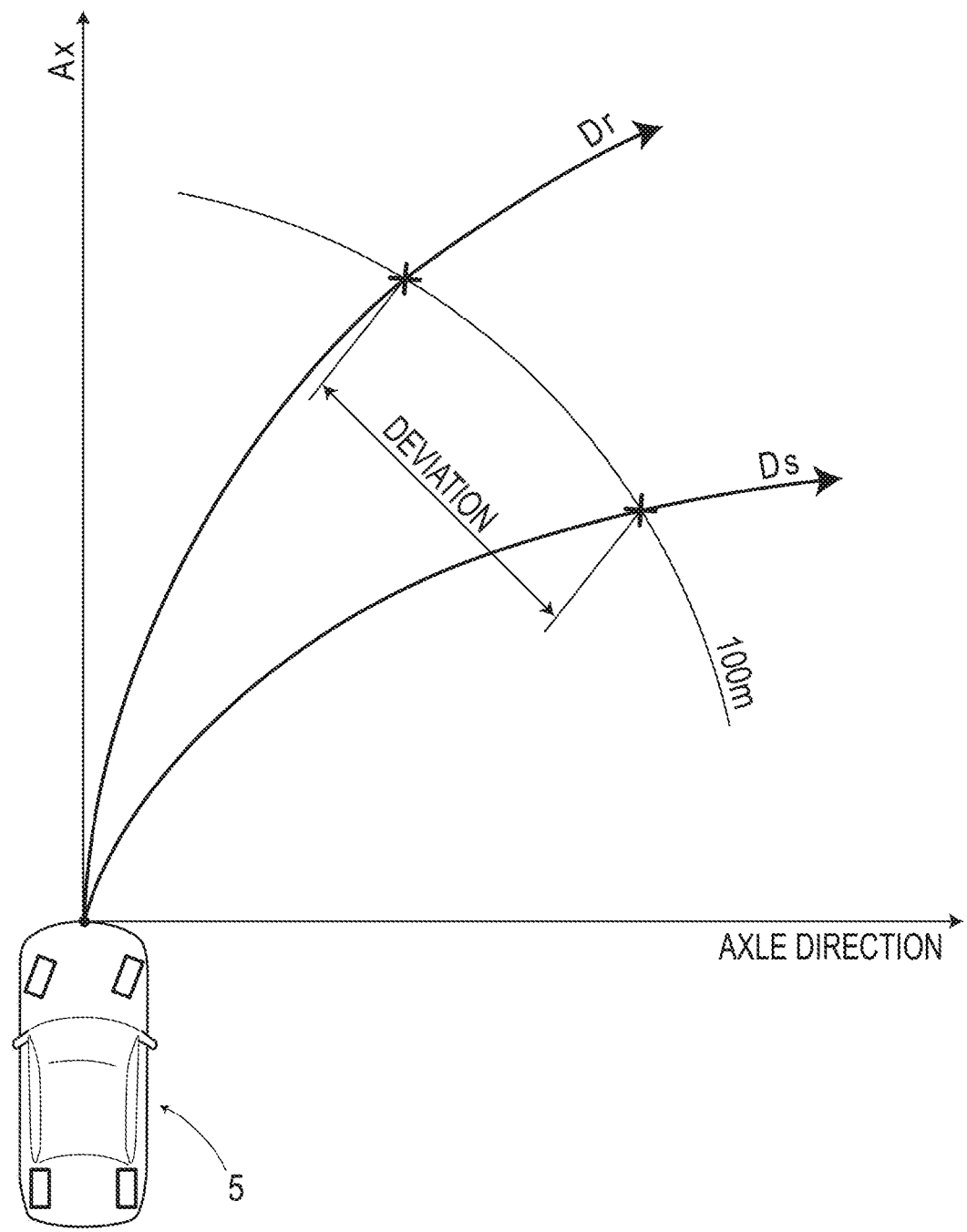

VEHICULAR ORIENTATION DETECTION SYSTEM

CROSS-REFERENCE TO RELATED APPLICATIONS

The present application is based on PCT filing PCT/JP2017/030274, filed Aug. 24, 2017 which claims priority to JP 2016-168474, filed Aug. 30, 2016, the entire contents of which are incorporated herein by reference.

TECHNICAL FIELD

The present invention relates to an orientation detection system for detecting the orientation of a traveling vehicle.

BACKGROUND ART

Conventionally, various control techniques have been suggested to stabilize traveling of a vehicle (for example, refer to the following Patent Literature 1). In these control techniques, for better vehicle control, it is essential to detect the orientation or the like of a traveling vehicle to grasp the traveling situation with high accuracy. To detect the orientation or the like of the traveling vehicle, various sensors are utilized, such as a yaw rate sensor and acceleration sensor.

CITATION LIST

Patent Literature

Patent Literature 1: Japanese Unexamined Patent Application Publication No. 2006-117176

SUMMARY OF INVENTION

Technical Problem

There is a problem in which a sensor such as a yaw rate sensor or acceleration sensor merely identifies a relative orientation change of the vehicle by measuring a force acting on the sensor and it is difficult to grasp the orientation of the vehicle with respect to the road surface.

The present invention was made in view of the above-described conventional problem, and is to provide a vehicular orientation detection system which detects the orientation of the vehicle with respect to the road surface.

Solution to Problem

The present invention resides in a vehicular orientation detection system for detecting an orientation of a vehicle traveling a road surface where magnetic markers are laid, the system including:
  a lateral shift amount measurement part which measures a lateral shift amount with respect to the magnetic markers; and
  a lateral shift amount difference acquiring part which obtains a difference between lateral shift amounts measured with any one of the magnetic markers by a plurality of said lateral shift amount measurement parts positioned at at least two locations separated in a longitudinal direction of the vehicle.

The vehicular orientation detection system of the present invention is a system which detects the orientation of the vehicle by using magnetic markers laid in the road surface. This orientation detection system uses a plurality of lateral shift amount measurement parts separated in the longitudinal direction of the vehicle to measure the lateral shift amounts with the same magnetic marker. And, as an index indicating the orientation of the vehicle, a difference between the lateral shift amounts measured by the lateral shift amount measurement parts located at different positions in the longitudinal direction of the vehicle is obtained.

As described above, according to the orientation detection system of the present invention, detection of the orientation of the vehicle with respect to the road surface can be made by using magnetic markers.

BRIEF DESCRIPTION OF DRAWINGS

FIG. 1 is a front view of a vehicle configuring an orientation detection system in a first embodiment.
FIG. 2 is a configuration diagram of the orientation detection system in the first embodiment.
FIG. 3 is a block diagram depicting an electrical configuration of a vehicle onboard device configuring the orientation detection system in the first embodiment.
FIG. 4 is a block diagram depicting the configuration of a magnetic sensor in the first embodiment.
FIG. 5 is a descriptive diagram exemplarily depicting a temporal change of a magnetic distribution in a vehicle width direction at the time of passage over a magnetic marker in the first embodiment.
FIG. 6 is a descriptive diagram exemplarily depicting a temporal change of a peak value of a magnetic measurement value at the time of passage over magnetic markers in the first embodiment.
FIG. 7 is a descriptive diagram of a method of measuring a lateral shift amount in the first embodiment.
FIG. 8 is a flow diagram depicting a flow of process by the orientation detection system in the first embodiment.
FIG. 9 is a descriptive diagram of a detection duration by a rear-side sensor unit in the first embodiment.
FIG. 10 is a flow diagram depicting a flow of vehicle orientation detection process in the first embodiment.
FIG. 11 is a descriptive diagram of a lateral shift amount measured by a front-side sensor unit and a lateral shift amount measured by the rear-side sensor unit in the first embodiment.
FIG. 12 is a descriptive diagram of a difference Ofd between the lateral shift amounts by the front and rear sensor units and a vehicle body deviation angle Af in the first embodiment.
FIG. 13 is a descriptive diagram of a traveling situation of neutral steer in the first embodiment.
FIG. 14 is a descriptive diagram of a traveling situation of oversteer in the first embodiment.
FIG. 15 is a descriptive diagram of a traveling situation of understeer in the first embodiment.
FIG. 16 is a descriptive diagram of a situation in which a vehicle travels along a traveling road with magnetic markers laid in a second embodiment.
FIG. 17 is a descriptive diagram of a relation between a route direction of the traveling road and a steering direction of the vehicle in the second embodiment.

DESCRIPTION OF EMBODIMENTS

Preferable modes of the present invention are described.
An orientation angle acquiring part which acquires an angle of the vehicle in a turning direction corresponding to the difference between the lateral shift amounts is preferably provided.

The difference between the lateral shift amounts measured with the same magnetic marker by a plurality of lateral shift amount measurement parts at different positions in the longitudinal direction of the vehicle can be handled as an index indicating a vehicle orientation. However, this difference between the lateral shift amounts depends on the distance between the corresponding lateral shift amount measurement parts in the longitudinal direction, and has a larger value if this distance is longer. By contrast, the above-described angle in the turning direction is a normalized index irrespective of the length of the distance between two lateral shift amount measurement parts in the longitudinal direction.

The detection of the orientation is preferably performed when the difference between the lateral shift amounts measured by any one of the lateral shift amount measuring parts with two magnetic markers positioned as separated in a route direction of a traveling road is smaller than a predetermined threshold.

As a situation of traveling not along the route direction of the traveling road, a situation such as lane change can be assumed. In this situation traveling not along the route direction of the traveling road but traveling with a course change of the vehicle, there is a possibility that the difference (an absolute value) between the lateral shift amounts measured with the same magnetic marker by the plurality of lateral shift amount measurement parts is increased irrespective of the vehicle orientation. If a threshold determination is performed for the difference between the lateral shift amounts measured with two magnetic markers by the same lateral shift amount measurement part, it is possible to determine with high accuracy whether the situation is such that traveling is along the route direction of the traveling road. If the detection of the vehicle orientation is performed in the situation of traveling along the route direction of the traveling road, high detection accuracy can be ensured.

The system preferably includes a steering angle measurement part which measures a steering angle that indicates a steering direction of a steering wheel equipped in the vehicle, and the detection of the orientation is preferably performed when a change amount of the steering angle per unit time is smaller than a predetermined threshold.

In a traveling situation with abrupt steering with the steering wheel, the difference (the absolute value) between the lateral shift amounts measured with the same magnetic marker by the plurality of lateral shift amount measurement parts increases irrespective of the vehicle orientation. Thus, if the detection of the orientation is performed when the change amount of the steering angle per unit time is smaller than the predetermined threshold, detection accuracy is easily ensured.

The detection of the orientation is preferably performed when a change amount of the vehicle in a traveling direction per unit time is smaller than a predetermined threshold.

In a situation in which the traveling direction of the vehicle abruptly fluctuates, there is a possibility that the difference (the absolute value) between the lateral shift amounts measured with the same magnetic marker by the plurality of lateral shift amount measurement parts increases, and this detection of the orientation based on the difference is not appropriate. Thus, the detection of the orientation is preferably performed when the change amount of the vehicle in the traveling direction per unit time is smaller than the predetermined threshold.

The system preferably includes a route data acquiring part which acquires route data representing a route direction of a traveling road, a steering angle measurement part which measures a steering angle that indicates a steering direction of a steering wheel equipped in the vehicle, and a direction comparison part which computes a degree of coincidence between the route direction represented by the route data and the steering direction corresponding to a measurement value of the steering angle, and the detection of the orientation is preferably performed when the degree of coincidence is equal to or larger than a predetermined threshold.

When the degree of coincidence between the route direction of the traveling road and the steering direction is equal to or larger than the predetermined threshold, the situation is determined as a situation of traveling along the traveling road, and the detection of the orientation is preferably performed. As a degree of coincidence between the route direction and the steering direction, for example, the inverse of a deviation between a position 100 m ahead in the route direction and a position 100 m ahead in the steering direction, a correlation coefficient between a curve represented by the route direction and a curve represented by the steering direction, or the like can be adopted.

EMBODIMENTS

Embodiments of the present invention are specifically described by using the following examples.

First Embodiment

The present example is an example regarding an orientation detection system 1 for detecting an orientation of a vehicle (vehicle orientation) using magnetic markers 10 laid in a road surface. Details about this are described by using FIG. 1 to FIG. 15.

The orientation detection system 1 is a vehicular system for detecting the vehicle orientation by using the magnetic markers 10 laid in a road surface 100S, as in FIG. 1 to FIG. 3. The orientation detection system 1 is configured to include a vehicle onboard device including a combination of front-side and rear-side sensor units 11 including magnetic sensors Cn (n is an integer from 1 to 15) and a control unit 12 which controls the sensor unit 11. In the following, after the magnetic marker 10 configuring the orientation detection system 1 are generally described, the configuration of the vehicle onboard device including the sensor unit 11 and the control unit 12 is described.

The magnetic marker 10 (FIG. 1 and FIG. 2) is a road marker laid in a road surface 100S so as to be lined up along the center of a lane 100 where a vehicle 5 travels. This magnetic marker 10 is formed in a columnar shape having a diameter of 20 mm and a height of 28 mm, and can be accommodated in a hole provided to the road surface 100S. A magnet forming the magnetic marker 10 is a ferrite plastic magnet formed by dispersing a magnetic powder of iron oxide as a magnetic material in a polymer material as a base material, and has a characteristic of a maximum energy product (BHmax)=6.4 kJ/m$^3$. This magnetic marker 10 is laid in a state of being accommodated in the hole bored in the road surface 100S.

Specifications of the magnetic marker 10 of the present example are partially described in Table 1.

TABLE 1

| Type of magnet | Ferrite plastic magnet |
|---|---|
| Diameter | ϕ20 mm |
| Height | 28 mm |
| Magnetic flux | 45 mT |

TABLE 1-continued density Gs of
the surface

This magnetic marker 10 can act with magnetism having a magnetic flux density of 8 μT ($8×10^{-6}$ T, T: tesla) at a height of 250 mm, which is an upper limit of a range from 100 to 250 mm, assumed as an attachment height of the magnetic sensors Cn.

Next, the sensor unit 11 and the control unit 12 configuring the orientation detection system 1 are described.

The sensor unit 11 is a unit attached to a vehicle body floor 50 corresponding to a bottom surface of the vehicle 5, as depicted in FIG. 1 and FIG. 2. The sensor unit 11 serves as one example of a lateral shift amount measurement part for measuring a lateral shift amount of the vehicle 5 with respect to the magnetic marker 10. In the orientation detection system 1, the sensor units 11 are arranged at two locations positioned as separated in a longitudinal direction of the vehicle 5. Note in the following description that a space between a front-side sensor unit 11 and a rear-side sensor unit 11 in the longitudinal direction of the vehicle is referred to as a sensor span S.

The front-side sensor unit 11 is attached near the inside of a front bumper, and the rear-side sensor unit 11 is attached near the inside of a rear bumper. In the case of the vehicle 5 of the present example, the attachment heights of the sensor units with respect to the road surface 100S are both 200 mm.

Each sensor unit 11 includes, as in FIG. 2 and FIG. 3, fifteen magnetic sensors Cn arrayed on a straight line along a vehicle width direction and a detection processing circuit 110 having a CPU not depicted and so forth incorporated therein. Fifteen magnetic sensors Cn are arrayed so as to be evenly spaced 0.1 m apart, and a space between the magnetic sensors C1 and C15 at both ends is 1.4 m.

The detection processing circuit 110 (FIG. 3) is an arithmetic circuit which performs various computation processes such as a marker detection process for detecting the magnetic marker 10. This detection processing circuit 110 is configured of a CPU (central processing unit) which performs various computations, and also by using elements such as memory elements including a ROM (read only memory) and a RAM (random access memory).

The detection processing circuit 110 performs marker detection process and so forth by acquiring a sensor signal outputted from each magnetic sensor Cn. The results of detection of the magnetic marker 10 computed by the detection processing circuit 110 are all inputted to the control unit 12. The detection results include a lateral shift amount with respect to the magnetic marker 10, in addition to whether the magnetic marker 10 has been detected. Note that the front-side and rear-side sensor units 11 can both perform marker detection process in a period of 3 kHz.

Here, the configuration of each magnetic sensor Cn is described. In the present example, as in FIG. 4, a one-chip MI sensor having an MI element 21 and a driving circuit integrated therein is adopted as the magnetic sensor Cn. The MI element 21 is an element including an amorphous wire 211 made of a CoFeSiB-based alloy with approximately zero magnetostriction and a pickup coil 213 wound around this amorphous wire 211. The magnetic sensor Cn detects magnetism acting on the amorphous wire 211 by measuring a voltage occurring at the pickup coil 213 when a pulse current is applied to the amorphous wire 211. The MI element 21 has detection sensitivity in an axial direction of the amorphous wire 211 as a magneto-sensitive body. In each magnetic sensor Cn of the sensor unit 11 of the present example, the amorphous wire 211 is disposed along a vertical direction.

The driving circuit is an electronic circuit including a pulse circuit 23 which supplies a pulse current to the amorphous wire 211 and a signal processing circuit 25 which samples and outputs a voltage occurring at the pickup coil 213 at a predetermined timing. The pulse circuit 23 is a circuit including a pulse generator 231 that generates a pulse signal which is a base signal of a pulse current. The signal processing circuit 25 is a circuit which takes out an induced voltage of the pickup coil 213 via a synchronous detection 251 which is opened and closed in conjunction with a pulse signal, and amplifies the voltage by an amplifier 253 at a predetermined amplification factor. A signal amplified by this signal processing circuit 25 is externally outputted as a sensor signal.

The magnetic sensor Cn is a high-sensitivity sensor having a measurement range of a magnetic flux density of ±0.6 mT and a magnetic flux resolution of 0.02 μT within the measurement range. This high sensitivity is achieved by the MI element 21 using the MI effect in which the impedance of the amorphous wire 211 sensitively changes in accordance with the external magnetic field. Furthermore, this magnetic sensor Cn can perform high-speed sampling in a period of 3 kHz and supports high-speed vehicle traveling. The magnetic sensor Cn inputs a sensor signal to the detection processing circuit 110 every time magnetic measurement is performed. Note in the present example that the period of magnetic measurement by the magnetic sensor Cn is set at 3 kHz.

Specifications of the magnetic sensor Cn are partially described in Table 2.

TABLE 2

| Measuring range | ±0.6 mT |
|---|---|
| Magnetic flux resolution | 0.02 μT |
| Sampling period | 3 kHz |

As described above, the magnetic marker 10 can act with magnetism having a magnetic flux density equal to or larger than 8 μT ($8×10^{-6}$ T) in a range of 100 to 250 mm assumed as an attachment height of the magnetic sensors Cn. The magnetic marker 10 acting with magnetism having a magnetic flux density equal to or larger than 8 μT is detectable with high reliability by using the magnetic sensor Cn having a magnetic flux resolution of 0.02 μT.

Next, the control unit 12 is a unit which controls the front-side and rear-side sensor units 11 and detects the vehicle orientation by using the detection result of each sensor unit 11, as in FIG. 1 to FIG. 3. The detection result of the vehicle orientation by the control unit 12 is inputted to a vehicle ECU not depicted, and is used for various vehicle controls for enhancing traveling safety, such as throttle control, brake control, and torque control of each wheel.

The control unit 12 includes an electronic board (omitted in the drawings) having implemented thereon memory elements such as a ROM and RAM, and so forth, in addition to a CPU which performs various computations. The control unit 12 controls the front-side sensor unit 11 and the rear-side sensor unit 11, and detects the vehicle orientation by using the detection result of each sensor unit 11.

The control unit 12 includes each of the following functions.

(a) Duration setting part: when the front-side sensor unit 11 detects the magnetic marker 10, the part predicts a time point of when the rear-side sensor unit 11 can detect the same magnetic marker 10, and sets a temporal duration including the detectable time point as a detection duration.

(b) Lateral shift amount difference acquiring part: the part computes a difference between a lateral shift amount with respect to the magnetic marker 10 measured by the front-side sensor unit 11 and a lateral shift amount measured by the rear-side sensor unit 11.

(c) Orientation angle acquiring part: the part detects the vehicle orientation from the difference between the lateral shift amounts of the front-side and rear-side sensor units 11. Details about the vehicle orientation to be detected will be described in detail further below.

Next, description is made to each of the following: (1) a marker detection process for each sensor unit 11 to detect the magnetic marker 10, (2) a flow of entire operation of the orientation detection system 1, and (3) a vehicle orientation detection process.

(1) Marker Detection Process

The front-side and rear-side sensor units 11 perform marker detection process in a period of 3 kHz by the control of the control unit 12. The sensor unit 11 performs sampling on magnetic measurement values indicated by sensor signals from fifteen magnetic sensors Cn for each of periods (p1 to p7) of performing a marker detection process to acquire a magnetic distribution in the vehicle width direction (refer to FIG. 5). A peak value of this magnetic distribution in the vehicle width direction becomes maximum as in the drawing when the vehicle passes over the magnetic marker 10 (in the period of p4 in FIG. 5).

When the vehicle 5 travels along a lane 100 where the magnetic markers 10 are laid, the peak value of the magnetic distribution in the vehicle width direction described above increases every time the vehicle passes over the magnetic marker 10 as in FIG. 6. In the marker detection process, a threshold determination regarding this peak value is performed, and it is determined that the magnetic marker 10 has been detected when the peak value is equal to or larger than a predetermined threshold value.

When detecting the magnetic marker 10, the sensor unit 11 identifies the position of the peak value in the vehicle width direction of the magnetic distribution in the vehicle width direction, which is a distribution of magnetic measurement values of the magnetic sensors Cn. By using the position of this peak value in the vehicle width direction, a lateral shift amount of the vehicle 5 with respect to the magnetic marker 10 can be computed. In the vehicle 5, the sensor unit 11 is attached so that the central magnetic sensor C8 is positioned on the center line of the vehicle 5. Thus, a deviation in the position of the above-described peak value in the vehicle width direction with respect to the magnetic sensor C8 indicates the lateral shift amount of the vehicle 5 with respect to the magnetic marker 10.

In particular, as in FIG. 7, the sensor unit 11 of the present example performs curve approximation (quadratic approximation) on the magnetic distribution in the vehicle width direction, which is a distribution of magnetic measurement values of the magnetic sensors Cn, to identify the position of the peak value of an approximation curve in the vehicle width direction. Using the approximation curve can identify the position of the peak value with accuracy finer than a space between the fifteen magnetic sensors, and can measure the lateral shift amount of the vehicle 5 with respect to the magnetic marker 10 with high accuracy.

(2) Entire Operation of the Orientation Detection System 1

The entire operation of the orientation detection system 1 is described by using a flow diagram of FIG. 8, with the control unit 12 mainly as a subject.

The control unit 12 causes the front-side sensor unit 11 to perform the marker detection process described above (S101, a first detection step), and causes this marker detection process to be repeatedly performed until the magnetic marker 10 is detected (S102: NO). When receiving from the front-side sensor unit 11 an input indicating that the magnetic marker 10 has been detected (S102: YES), the control unit 12 sets a detection duration, which is a temporal duration in which the rear-side sensor unit 11 is caused to perform the marker detection process (S103, a duration setting step).

Specifically, as in FIG. 9, the control unit 12 first adds a required time Ota acquired by dividing the above-described sensor span S (m) by a vehicle velocity (velocity of the vehicle) V (m/second) measured by a vehicle velocity sensor to a time t1, which is a time point of detection of the magnetic marker 10 by the front-side sensor unit 11. With this addition of the required time δta to the time t1, it is possible to predict a time t2 as a time point when the rear-side sensor unit 11 can detect the magnetic marker 10. The control unit 12 then sets, as a detection duration, a temporal section having a time (t2−δtb) acquired by subtracting a section time δtb acquired by dividing 1 (m), which is a reference distance, by the vehicle velocity V (m/second) from a time t2 as a start time and a time (t2+δtb) acquired by adding the section time δtb to the time t2 as an end time. Note that the reference distance can be changed as appropriate in consideration of the detection range of the sensor unit 11 and so forth.

The control unit 12 causes the rear-side sensor unit 11 to repeatedly perform the marker detection process in the detection duration (FIG. 9) set at the above-described step S103 (S104: NO→S114, a second detection step). Details about this marker detection process is the same as the marker detection process by the front-side sensor unit 11 at step S101.

In case the magnetic marker 10 was detected by the rear-side sensor unit 11 in the detection duration (FIG. 9) (S104: YES→S105: YES), the control unit 12 performs a vehicle orientation detection process described next for detecting the vehicle orientation (S106). On the other hand, in case the magnetic marker 10 was detected by the front-side sensor unit 11 (S102: YES) but the magnetic marker 10 was not detected by the rear-side sensor unit 11 in the above-described detection duration (FIG. 9) (S104: YES÷S105: NO), the control unit 12 returns to the marker detection process (S101) by the front-side sensor unit 11 to repeatedly perform the above-described series of processes.

(3) Vehicle Orientation Detection Process

The vehicle orientation detection process (step S106 in FIG. 8) to be performed by the control unit 12 is a process including, as in FIG. 10, a step of computing a difference between the lateral shift amounts measured by the front and rear sensor units 11 (S201) and a step of computing a vehicle body deviation angle representing a shift of the vehicle body with respect to the traveling direction (S202).

At step S201, as in FIG. 11, when the vehicle 5 passes over the magnetic marker 10, a difference Ofd (refer to FIG. 12) between a lateral shift amount Oft measured by the front-side sensor unit 11 and a lateral shift amount Of2 measured by the rear-side sensor unit 11 is computed by the following equation.

$$Ofd=(Of1-Of2) \quad \text{[Equation 1]}$$

At step S202, as in FIG. 12, a vehicle body deviation angle Af, which is an angle (n angle in the turning direction) formed by a traveling direction Dir of the vehicle 5 with respect to an axis Ax of the vehicle body of the vehicle 5 in the longitudinal direction, is computed. This vehicle body deviation angle Af is calculated by the following equation including the difference Ofd between the lateral shift amounts and the sensor span S.

$$Af=\arctan(COfd/S) \quad \text{[Equation 2]}$$

While the vehicle is in the middle of traveling along a route with a constant curvature including a straight road graspable as a traveling road with an infinite radius of curvature, a rear-wheel trace is ideally on an inner peripheral side with respect to a front-wheel trace by a so-called inner wheel difference. For example, while the inner wheel difference becomes evident when the vehicle turns a corner of an intersection at a right angle, the inner wheel difference is negligible in a situation in which the vehicle travels a curve with a large radius of curvature on an expressway or the like and thus the traces of the front wheel and the rear wheel approximately match each other.

While the vehicle 5 is in the middle of traveling along the route with the constant curvature, in a neutral steer traveling situation with high stability without occurrence of oversteer or understeer, the lateral shift amounts Of1 (refer to FIG. 12) and Of2 measured by the front-side and rear-side sensor units 11 coincides with each other and the difference Ofd is approximately zero. If the difference Ofd between the lateral shift amounts measured by the front and rear sensor units 11 is approximately zero, the vehicle body deviation angle Af based on this difference Ofd is zero.

During traveling a right curve as in FIG. 13, in a traveling situation with high stability without occurrence of oversteer or understeer, the vehicle body deviation angle Af is zero, and the axis Ax of the vehicle body coincides with the traveling direction Dir of the vehicle 5 forming a tangential direction of an arc forming the right curve. On the other hand, in a traveling situation in which absolute values of the difference Ofd and the vehicle body deviation angle Af increase although the vehicle 5 is traveling along the route with the constant curvature, there is a possibility of occurrence of slipping or the like in the front wheel or rear wheel in the vehicle width direction to cause understeer or oversteer.

For example, in a situation in which the vehicle is traveling along a traveling road with a right curve, if the vehicle body deviation angle Af with a clockwise direction as positive is larger than zero as in FIG. 14, an oversteer situation is assumed in which the rear wheel escapes outside the right curve or the front wheel turns inward. Also, for example, in the situation in which the vehicle is traveling along the traveling road with the right curve, if the vehicle body angle Af has a negative value smaller than zero as in FIG. 15, an understeer situation is assumed in which the front wheel escapes outside a left curve.

As described above, the vehicle body deviation angle Af is an index indicating an angular shift of the orientation of the vehicle body in the turning direction with respect to the traveling direction Dir of of the vehicle 5, and is a normalized index irrespective of the magnitude of the sensor span S of the front and rear sensor units 11.

Note that the difference Ofd (refer to FIG. 12) between the lateral shift amounts is also available as an index indicating the orientation of the vehicle 5. The situation in which the difference Ofd between the lateral shift amounts measured by the front and rear sensor units 11 is zero is a traveling situation in which the axis Ax of the vehicle body coincides with the traveling direction Dir of the vehicle 5 as in FIG. 13. On the other hand, a situation in which the absolute value of the difference Ofd between the lateral shift amounts is large, is a traveling situation in which the axis Ax of the vehicle body does not coincide with the traveling direction Dir of the vehicle 5 as in FIG. 14 and FIG. 15.

As described above, the orientation detection system 1 is a system which detects the vehicle orientation by using the magnetic markers 10 laid in the traveling road. According to this orientation detection system 1, the vehicle orientation with respect to the road surface can be detected with high reliability.

In the orientation detection system 1, the lateral shift amounts with respect to the magnetic marker 10 are respectively measured by two sensor units 11 positioned as separated in the longitudinal direction of the vehicle 5, and its difference Ofd is obtained. While the difference Ofd between the lateral shift amounts even as it is can be an index indicating a vehicle orientation, the vehicle body deviation angle Af corresponding to the difference Ofd between the lateral shift amounts is further calculated in the present example. The difference Ofd between the lateral shift amounts is an index which depends on the angle of the vehicle 5 in the turning direction and has a larger value as the length of the sensor span S is longer. On the other hand, the vehicle body deviation angle Af is a normalized index which does not depend on the length of the sensor span S between the front and rear sensor units 11.

In the present example, the sensor units 11 are provided at two locations in the longitudinal direction of the vehicle 5. In place of this, the sensor units 11 may be provided at three or more locations in the longitudinal direction of the vehicle 5. As for a combination of any two locations different in position in the longitudinal direction, an index such as the difference Ofd or the vehicle body deviation angle Af may be obtained for each to detect the vehicle orientation.

In the marker detection process by the front-side sensor unit 11 or the rear-side sensor unit 11, a difference in magnetic measurement values between the magnetic sensor of the front-side sensor unit 11 and the magnetic sensor of the rear-side sensor unit 11 may be computed and the magnetic marker 10 may be detected by using this computation value. According to this difference computation, a magnetic component of a difference acquired by subtracting a magnetic component detected by the front-side magnetic sensor from a magnetic component detected by the rear-side magnetic sensor can be generated, and this is effective in reducing common noise and so forth such as geomagnetism. Note that for difference computation, a difference may be obtained between magnetic sensors at the same position in the vehicle width direction.

In the present example, while the magnetic sensors Cn having sensitivity in the vertical direction are adopted, magnetic sensors having sensitivity in the traveling direction or magnetic sensors having sensitivity in the vehicle width direction may be adopted. Furthermore, for example, magnetic sensors having sensitivity in two axial directions of the vehicle width direction and the traveling direction, two axial directions of the vehicle width direction and the vertical direction, or two axial directions of the traveling direction and the vertical direction may be adopted. For example, a magnetic sensor having sensitivity in three axial directions of the vehicle width direction, the traveling direction, and the vertical direction may be adopted. Using a magnetic sensor having sensitivity in a plurality of axial directions can measure a magnetism acting direction together with the magnitude of magnetism and can generate magnetic vectors. By using a difference between the magnetic vectors and a change rate of the difference in the traveling direction, a distinction between magnetism of the magnetic markers 10 and disturbance magnetism can be made.

Note that while the magnetic marker made of a ferrite plastic magnet is exemplarily described in the present example, a magnetic marker made of a ferrite rubber magnet may be used.

Second Embodiment

The present example is an example in which the traveling situation of a detection target is limited to improve accuracy of detection of the vehicle orientation based on the orientation detection system of the first embodiment. Details about this are described with reference to FIG. 16 and FIG. 17.

If the traveling trace of the vehicle 5 does not have a constant curvature and the magnetic marker 10 is positioned in a curvature fluctuation section, there is a possibility that a difference occurs between the lateral shift amounts measured by the front and rear sensor units 11 which leads to increase the difference Ofd. In this situation, there is a possibility that the difference Ofd between the lateral shift amounts measured by the front and rear sensor units 11 with any one of the magnetic markers 10, the vehicle body deviation angle Af or the like does not reflect the orientation of the vehicle 5 with high accuracy.

Thus, in the orientation detection system of the present example, detection of the vehicle orientation is performed in the following traveling situations (1) to (4), thereby ensuring detection accuracy.

(1) A case in which a difference between the lateral shift amounts measured by any one of the sensor units 11 with two magnetic markers 10 positioned as separated in a route direction of the traveling road is smaller than a predetermined threshold.

In this case, the situation is considered as such that the vehicle 5 is traveling along the traveling road where the magnetic markers 10 are laid along the route direction as in FIG. 16. Generally, a section of connecting curves with different curvatures on the traveling road is designed so that the change of the curvature is smooth. Thus, in a situation in which the vehicle 5 is stably traveling along the traveling road, there is less fear of an excessive difference between the lateral shift amounts measured with any one of the magnetic markers 10 by the front and rear sensor units 11, and so forth. This tendency is particularly conspicuous in the case of an expressway where the change of the curvature is set to be very smooth in the above-described connecting section.

(2) A case in which, on the assumption that the system includes a steering angle measurement part such as a steering angle sensor which measures a steering angle that indicates a steering direction of a steering wheel equipped in the vehicle 5, a change amount of the steering angle per unit time is smaller than a predetermined threshold.

The change amount of the steering angle per unit time, that is, the change velocity of the steering angle, is fast and equal to or larger than the predetermined threshold, the traveling direction of the vehicle 5 abruptly changes. If the magnetic marker 10 is positioned in a section where the traveling direction of the vehicle 5 abruptly changes as described above, there is a high possibility that the difference between the lateral shift amounts measured with any one of the magnetic markers 10 by the front and rear sensor units 11 is large. In this case, there is a fear that the orientation of the vehicle 5 cannot be detected with high accuracy due to this difference between the lateral shift amounts.

(3) A case in which a change amount of the vehicle 5 in a traveling direction per unit time is smaller than a predetermined threshold.

The change amount of the vehicle 5 in the traveling direction per unit time, that is, the change velocity of the angle of the vehicle 5 in the turning direction, is fast and equal to or larger than the predetermined threshold, as with the case (2) described above, the possibility increases that the orientation of the vehicle 5 cannot be detected with high accuracy based on the difference between the lateral shift amounts measured by the front and rear sensor units 11. Note that the change velocity of the angle of the vehicle 5 in the turning direction may be measured by, for example, a yaw rate sensor, or may be measured from a change in velocity at which a distant view, a structure, or the like in successive images taken by a forward camera laterally moves to flow.

(4) A case in which, on the assumption that the system includes a route data acquiring part which acquires route data representing a route direction of a traveling road, a steering angle measurement part which measures a steering angle that indicates a steering direction of a steering wheel equipped in the vehicle 5, and a direction comparison part which computes a degree of coincidence between the route direction represented by the route data and the steering direction corresponding to a measurement value of the steering angle, this degree of coincidence is equal to or larger than a predetermined threshold.

In the situation in which the vehicle 5 is traveling along the traveling road, the orientation of the vehicle 5 can be detected with high accuracy by taking the difference between the lateral shift amounts measured with anyone of the magnetic markers 10 by the front and rear sensor units 11, or the like as an index, as in the case of the above-described (1). When the degree of coincidence between the route direction and the steering direction is high, it can be determined that the vehicle 5 is traveling along the traveling road.

As the degree of coincidence between a route direction Dr and a steering direction Ds, for example, the inverse of a deviation (distance) between a position 100 m ahead in the route direction Dr and a position 100 m ahead in the steering direction Ds may be adopted as in FIG. 17. Furthermore, as in the same drawing, on two-dimensional coordinates defined by the direction of the axis Ax of the vehicle body by taking the vehicle 5 as an origin and the vehicle width direction, a correlation coefficient between a curve representing the route direction Dr and a curve representing the steering direction Ds may be adopted as the above-described degree of coincidence. Note that the route data can be acquired from map data used by a navigation system or an automated driving system, and so forth.

Other configurations and operations and effects are the same as to those in the first example.

While specific examples of the present invention have been described in detail in the foregoing as in the examples, these specific examples each merely disclose an example of technology included in the scope of claims for patent. Needless to say, the scope of claims for patent should not be construed as being limited 10 by the configuration, numerical values, and so forth of the specific examples. The scope of claims for patent includes techniques acquired by variously modifying, changing, or combining the above-described specific examples by using known technology, knowledge of people skilled in the art, and so forth.

REFERENCE SIGNS LIST 1 orientation detection system
10 magnetic marker
100 lane
100S road surface
11 sensor unit (lateral shift amount measurement part)
110 detection processing circuit
12 control unit (duration setting part, lateral shift amount difference acquiring part, orientation angle acquiring part)
21 MI element
5 vehicle

The invention claimed is:

1. A vehicular posture detection system of a vehicle, comprising:
a first magnetic sensor configured to detect a plurality of magnetic markers laid in or on a road surface of a road on which a vehicle is traveling, the first magnetic sensor being located at a first position of the vehicle;
a second magnetic sensor configured to repeatedly perform magnetic marker detection processes with a predetermined period of cycles for detecting the plurality of magnetic markers, the second magnetic sensor being located at a second position of the vehicle, the first position and the second position being separated in a longitudinal direction of the vehicle; and
processing circuitry configured to
calculate a first lateral shift amount of the vehicle with respect to a first magnetic marker of the plurality of magnetic markers using a first detection result of the first magnetic sensor,
set, in response to the first magnetic sensor detecting the first magnetic marker, a temporal duration including a predicted time point when the second magnetic sensor is predicted to detect the first magnetic marker after the first magnetic sensor detecting the first magnetic marker as a detection duration for the second magnetic sensor to detect the first magnetic marker, the temporal duration starting at a start time before the predicted time point and ending at an end time after the predicted time point so that the second sensor detects the first magnetic marker during the temporal duration,
after the first magnetic sensor detecting the first magnetic marker, wait to perform the magnetic marker detection processes with the predetermined period of cycles until the start time for the second magnetic sensor, start controlling the second magnetic sensor to repeatedly perform the magnetic marker detection process with the predetermined period of cycles at the start time, and stop controlling the second magnetic sensor to repeatedly perform the magnetic marker detection process with the predetermined period of cycles at the end time,
calculate a second lateral shift amount of the vehicle with respect to the first magnetic marker using a first detection result of the second magnetic sensor,
calculate a third lateral shift amount of the vehicle with respect to a second magnetic marker of the plurality of magnetic markers using a second detection result of the first magnetic sensor, the second magnetic marker and the first magnetic marker being separated in a route direction of the road,
calculate a first difference between the first lateral shift amount and the third lateral shift amount, the first difference indicating a difference between the route direction of the road and a traveling direction of the vehicle,
determine whether the first difference is smaller than a predetermined threshold, and
in response to determining that the first difference is smaller than the predetermined threshold, calculate, as a vehicle posture which indicates an angle between an axis of a vehicle body of the vehicle in a longitudinal direction and the traveling direction of the vehicle, a second difference between the first lateral shift amount and the second lateral shift amount, and use the calculated second difference for controlling the vehicle.

2. The vehicular posture detection system according to claim 1, wherein
the processing circuitry is configured to:
obtain a steering angle that indicates a steering direction of a steering wheel equipped in the vehicle,
determine whether a change amount of the steering angle per unit time is smaller than a second predetermined threshold, and
in response to determining that the change amount is smaller than the second predetermined threshold, calculate, as the vehicle posture, the second difference between the first lateral shift amount and the second lateral shift amount.

3. The vehicular posture detection system according to claim 1, wherein
the processing circuitry is configured to:
determine whether a change amount of an angle of the vehicle in a turning direction of the vehicle per unit time is smaller than a second predetermined threshold, and
in response to determining that the change amount is smaller than the second predetermined threshold, calculate, as the vehicle posture, the second difference between the first lateral shift amount and the second lateral shift amount.

4. The vehicular posture detection system according to claim 2, wherein
the processing circuitry is configured to:
determine whether a second change amount of an angle of the vehicle in a turning direction of the vehicle per unit time is smaller than a third predetermined threshold, and
in response to determining that the second change amount is smaller than the third predetermined threshold, calculate, as the vehicle posture, the second difference between the first lateral shift amount and the second lateral shift amount.

5. The vehicular posture detection system according to claim 1, wherein
the processing circuitry is configured to:
obtain route data representing a route direction of a traveling road,
obtain a steering angle that indicates a steering direction of a steering wheel equipped in the vehicle,
calculate a degree of coincidence between the route direction represented by the route data and the steering direction corresponding to the steering angle, and
in response to the degree of coincidence being equal to or larger than a second predetermined threshold, calculate, as the vehicle posture, the second difference between the first lateral shift amount and the second lateral shift amount.

6. The vehicular posture detection system according to claim 1, wherein
the processing circuitry calculates the second difference only when the processing circuitry determines that the first difference is smaller than the predetermined threshold, and
the second difference is not calculated and used for controlling the vehicle when the processing circuitry determines that the first difference is not smaller than the predetermined threshold.

7. The vehicular posture detection system according to claim 1, wherein
the processing circuitry sets the temporal duration based on a distance between each adjacent magnetic markers of the plurality of magnetic markers and a velocity of the vehicle.

8. The vehicular posture detection system according to claim 1, wherein
the first magnetic sensor is located at more front side of the vehicle than the second magnetic sensor.

9. The vehicular posture detection system according to claim 1, wherein
the processing circuitry sets the temporal duration based on a distance between each adjacent magnetic markers of the plurality of magnetic markers and a velocity of the vehicle when the first magnetic sensor detects the first magnetic marker.

10. The vehicular posture detection system according to claim 1, wherein
the processing circuitry sets the temporal duration based on a velocity of the vehicle and a distance between the first magnetic sensor and the second magnetic sensor.

* * * * *